June 4, 1957  G. A. YALE  2,794,362
TAP ANALYZER
Filed July 13, 1953  5 Sheets-Sheet 3
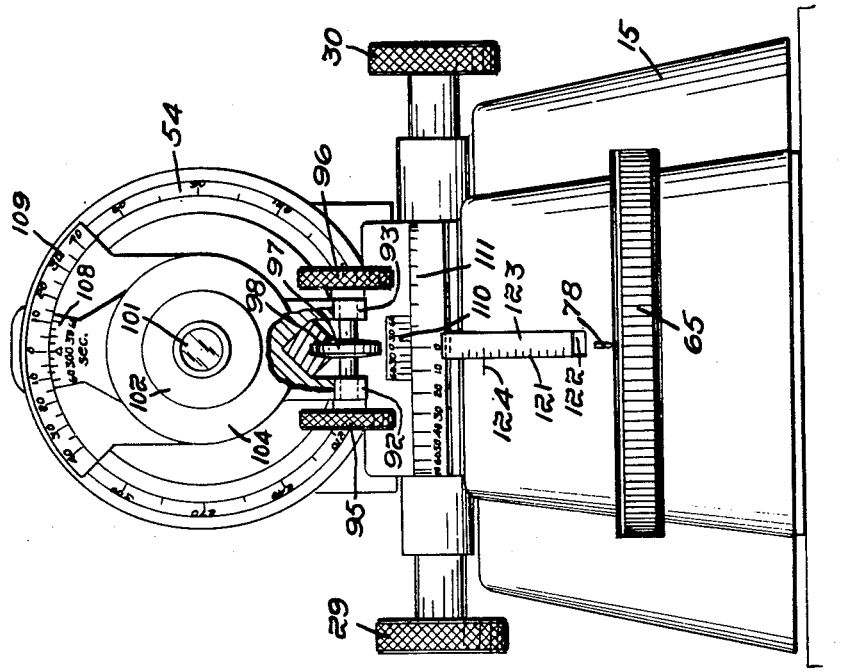
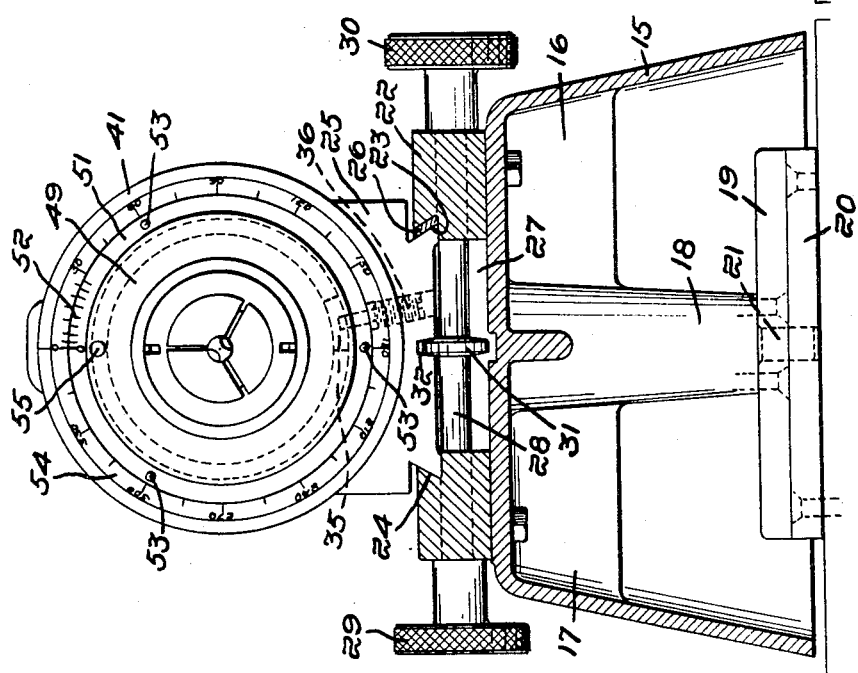
Inventor:
Gordon A. Yale,
by Thomson + Thomson
Attorneys

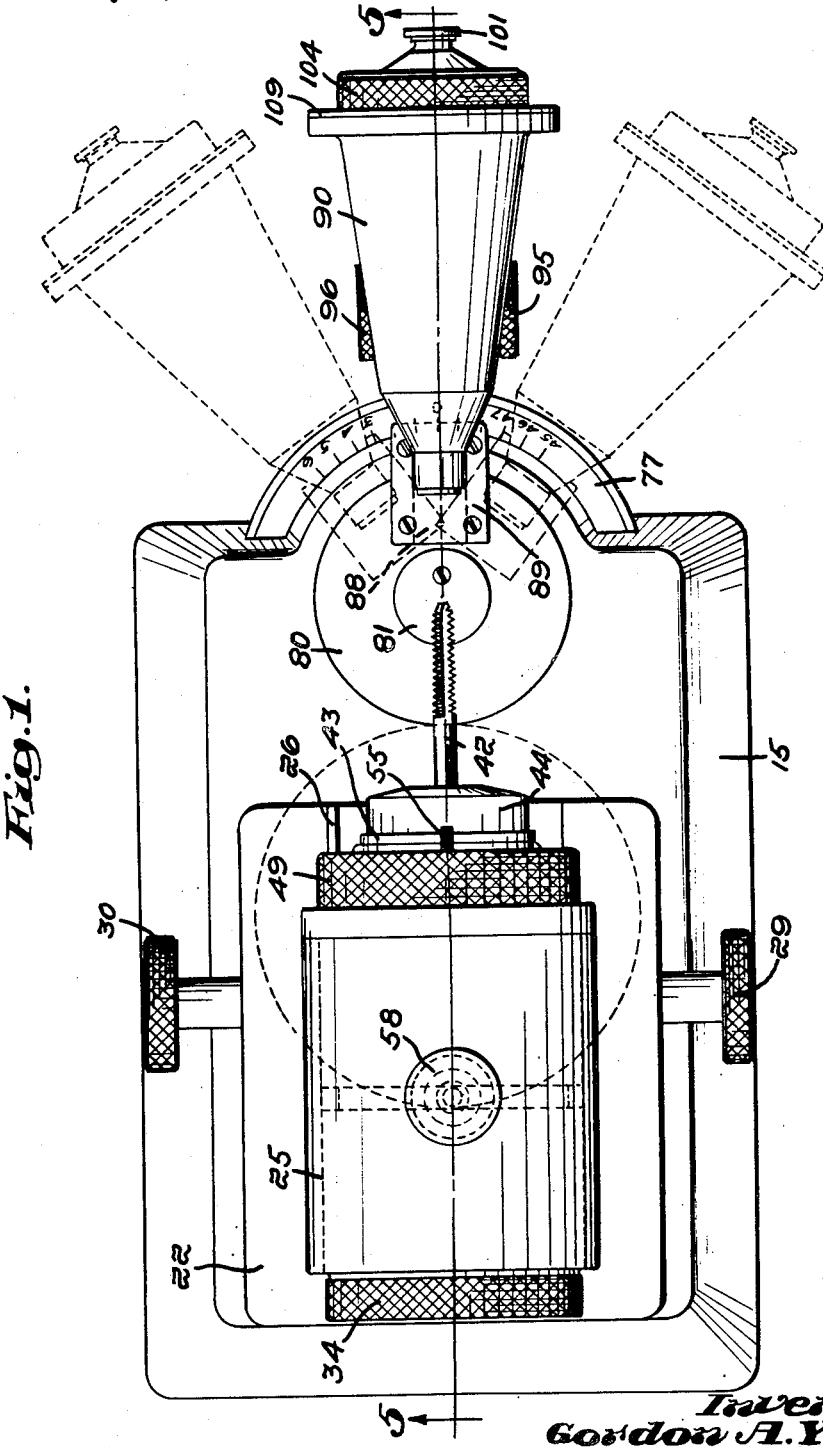

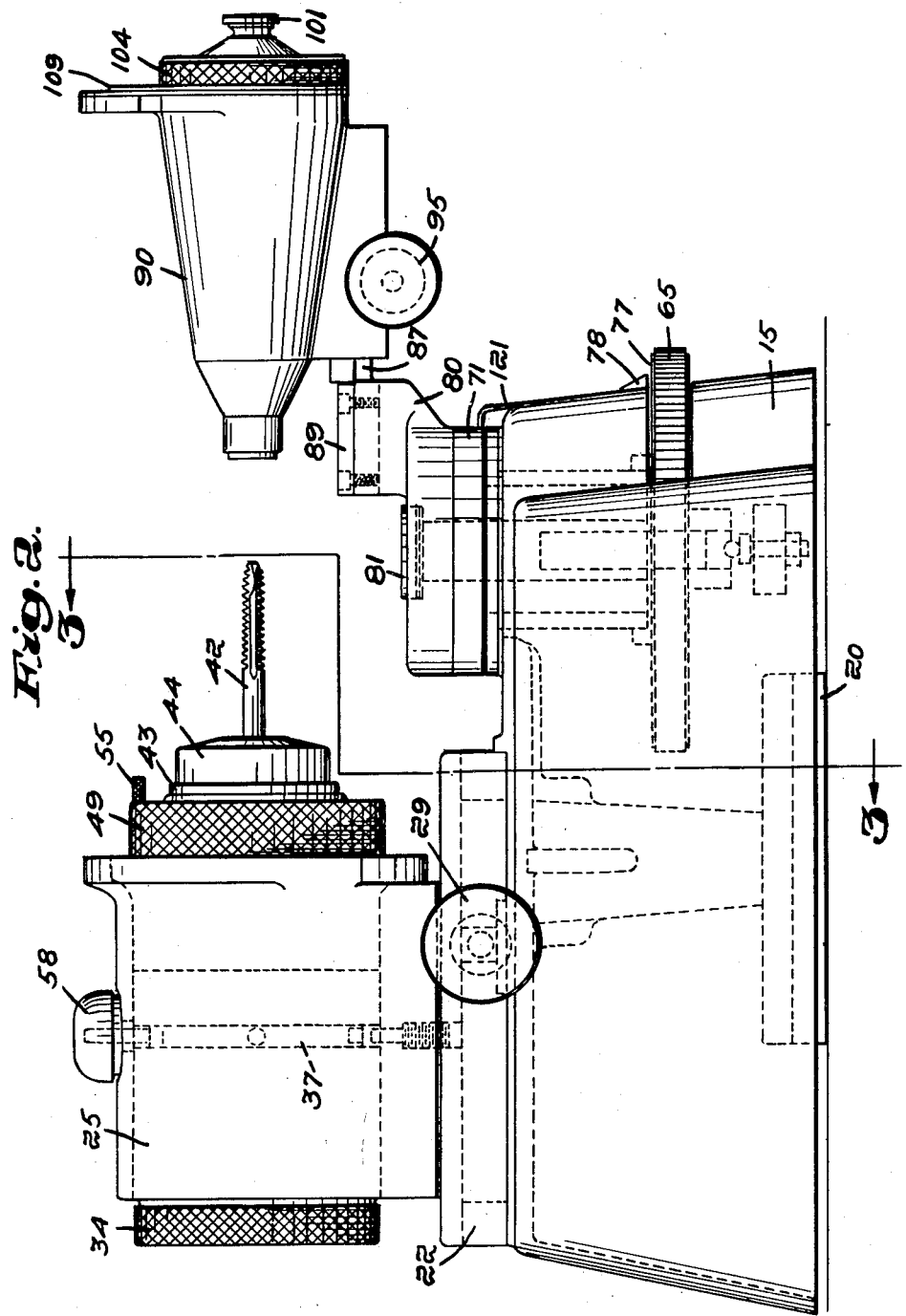

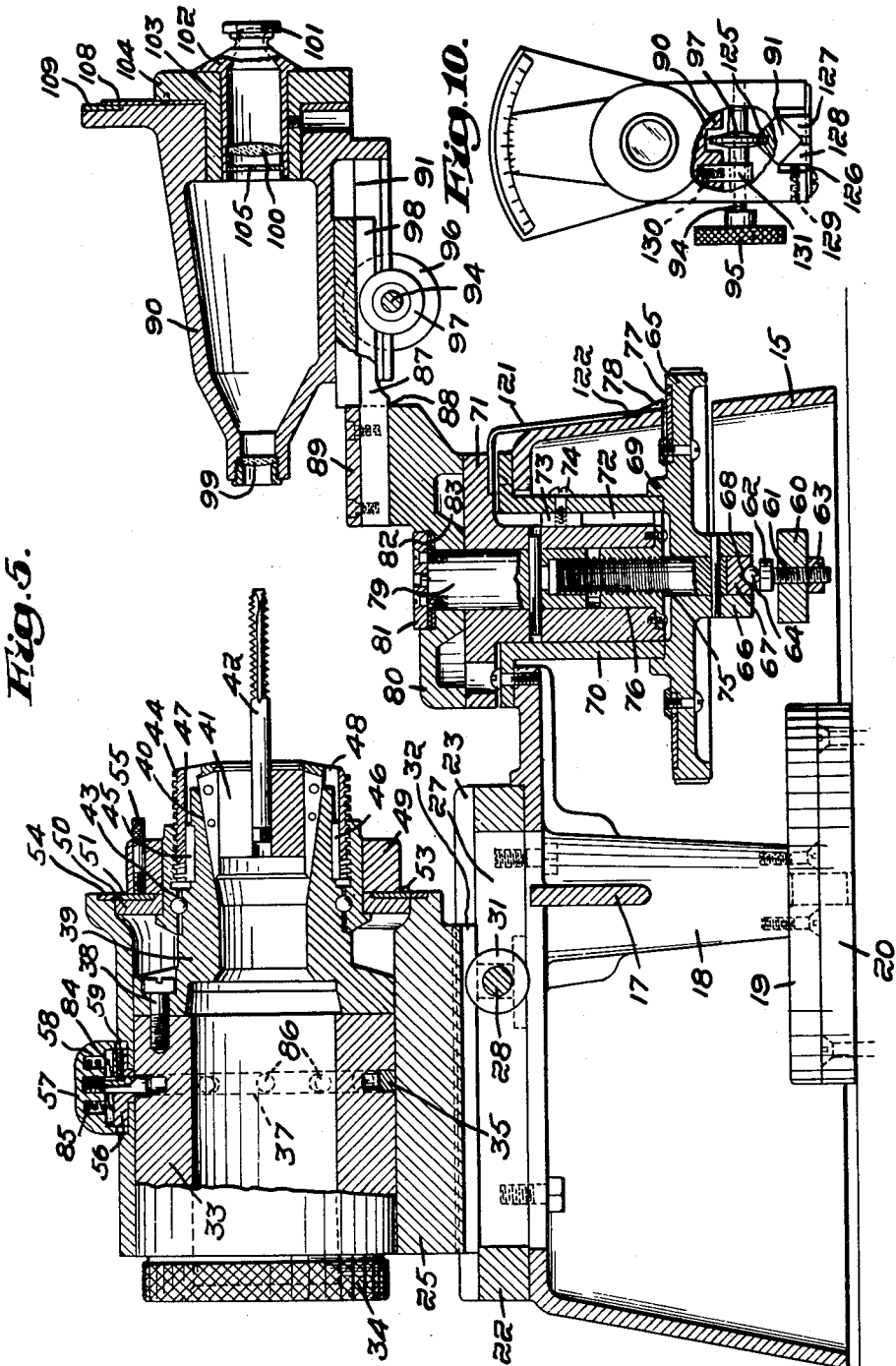

United States Patent Office 2,794,362
Patented June 4, 1957

2,794,362

TAP ANALYZER

Gordon A. Yale, Marblehead, Mass., assignor to Stocker & Yale, Inc., Marblehead, Mass., a corporation of Massachusetts Application July 13, 1953, Serial No. 367,553

10 Claims. (Cl. 88—14)

This invention relates to a device for measuring the critical dimensions of cutting tools, such as taps, drills, reamers and thread chasers.

The close tolerance requirements for large scale production of modern machinery, for example in the automotive and aircraft field, has created a demand for closer control of the dimensions of cutting tools used in production. In particular, in the manufacture of taps, accurate control of flute grinding has been recognized as highly desirable, since the accuracy of a threaded hole, as well as the cutting torque required, depends to a considerable extent on maintaining uniformity of the hook or rake angle at the tip of the cutting teeth. Tap flutes are ordinarily ground to produce either a flat rake face or a curved hook face at the front of the teeth, depending on the type of material to be cut. The measurement of the hook angle, or angle at the crest of the thread between the tangent to the flute face and the centerline of the tap, is difficult to accomplish, except by cutting a section through the tap, a method which results in destruction of the sample tool. For this reason, the more commonly used criterion of flute shape is the chord angle, or angle between a centerline through the tip of the thread and the chord connecting the tip and root at the flute face, taken in a plane perpendicular to the axis of the tap. This method of determining flute shape is admittedly only relative, since the chord angle will vary with the pitch of the thread, even though the hook angle remains the same.

The instrument here disclosed is adapted to measure accurately, either hook or rake angle of any particular tooth on a tap or other cutting tool, as well as other critical dimensions such as flute index, pitch and root diameters, concentricity of the various diameters, and chamfer angle at the tip, all without destroying the tool. The instrument thus permits direct inspection of tools used in production, rather than mere sampling of a run of tools. By means of this instrument furthermore, the hook or rake angle of each tooth of a tap may be rapidly and accurately measured, to determine the uniformity of the flute grind throughout the length of the tool. The inspection of each tooth individually is accomplished by means of an optical system set to view the tap at a slight angle to the tap axis.

The instrument consists in general of a chuck for securing the tool, and a microscope for viewing the tool, mounted on a common base and cooperating with appropriate built in scales to give direct indication of the various tool dimensions. Both the chuck and the optical system of the microscope are rotatable about their axes and horizontally movable in their axial directions. In addition, the microscope is vertically movable, and can be rotated about a vertical axis passing through the focal point of the optical system, or about some other vertical axis, so as to view the tool at any angle between zero and ninety degrees to the tool axis.

In the drawings illustrating the invention:

Fig. 1 is a plan view of a measuring device constructed according to the invention;

Fig. 2 is a side elevation of the device;

Fig. 3 is a cross-sectional taken along line 3—3 of Fig. 2;

Fig. 4 is an end elevation of the right hand end of the device as viewed in Fig. 1.

Fig. 5 is a cross-section taken along line 5—5 of Fig. 1;

Fig. 10 is a partial elevation of the right hand end of the device illustrating an alternative horizontal drive for the microscope housing.

Figure 6:
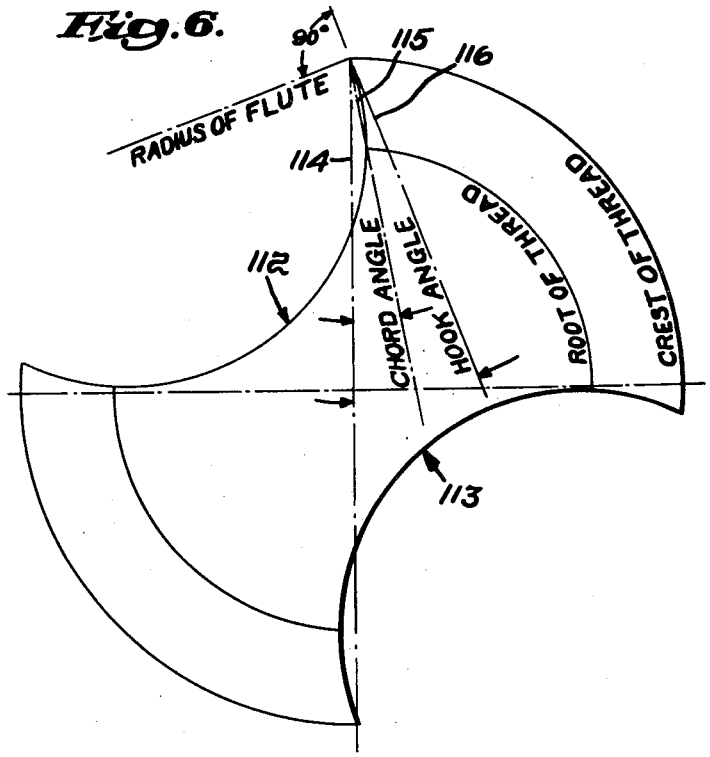
Fig. 6 is a diagram illustrating certain critical dimensions of a tap tooth.

The various operating elements of the instrument are supported on a hollow base casting 15, having internal reinforcing ribs 16 and 17 connected to a central internal pedestal 18. A circular plate 19 is attached to the bottom of pedestal 18 and is rotatably mounted on a base plate 20 which may be screwed down to a table or work bench. The two plates are connected by a central pin 21. As apparent in the drawings, casting 15 is clear of the table surface, so that the entire instrument can be rotated about pin 21 for convenience in making all readings from one position.

Attached to casting 15 is a bed plate 22 carrying horizontal V-ways 23 and 24 and having a cut out area 27. A sleeve block 25 is mounted for horizontal sliding motion in ways 23 and 25, and is locked and aligned in the ways by means of a gib 26. Journalled in plate 22 and extending across the cut out area is a shaft 28, to either end of which are attached knurled hand wheels 29 and 30. A disk 31, tapered toward its rim, is mounted on shaft 28 and engages an inwardly tapered slot 32 cut in the underside of block 25 parallel to the ways. The taper of the disk and slot is preferably about 4° and the slot is sufficiently deep so that the rim of the disk does not engage the bottom. The disk is carefully fitted to the slot and provides a friction drive, virtually without backlash, for moving block 25 horizontally in the ways.

A trunnion 33 is rotatably mounted in sleeve block 25 and has an extending end which is knurled to form a hand wheel 34. A key 35 secured to block 25 by a locking pin 36 engages a circumferential groove 37 in the trunnion and locks the trunnion at the bottom against horizontal movement with respect to the sleeve block. Attached to the top of block 25 is a bushing 56 in which is mounted a sliding pin 57, screwed at the top to a hand knob 58. A set screw 59 extends into a slot 84 to retain the pin. A compression spring 85 normally holds the knob and pin out, leaving trunnion 33 free to rotate. Attached to trunnion 33, by three bolts, for example, bolt 38, is a chuck body 39 having a tapered mouth 40 which accommodates a collet 41, for gripping the shank of the cutting tool to be examined. Interchangeable collets of various sizes may be used to accommodate a wide range of tool sizes. It will be noted, also, that the chuck body and trunnion are hollow, so that very long tools may be accommodated. An internally threaded sleeve 43 is rotatably mounted on ball bearings on body 39, and cooperates with externally threaded nut 44 to tighten the collet. The nut is guided by keys 45 and 46 riding in key ways 47 and 48, respectively. A knurled ring 49 is attached to sleeve 43 to provide a hand grip for tightening the chuck. To facilitate tightening the knob 58, previously described, may be temporarily depressed; causing pin 57 to engage one of the series of holes 86 in the bottom of slot 37 and lock trunnion 33 against rotary motion.

A collar 50 is also mounted on sleeve 43. Between this collar and ring 49 is mounted a slip ring 51 which carries a vernier scale 52, designed to cooperate with a fixed protractor scale 54 attached to block 25. The slip ring is provided with bosses 53 to facilitate setting by hand. When set in the desired position slip ring 51 can be locked to the chuck sleeve assembly by tightening a knurled locking screw 55 mounted in ring 49.

Mounted in a base plate 60 attached to casting 15 is a screw 61, having a hardened flat head 62 and secured by a nut 63. The head of the screw forms a bearing for a pivot ball 64 on which hand wheel 65 is rotatably mounted. The wheel has a hub 66 on its under side in which is mounted a hardened bearing block 67 having a conical recess 68 which engages the ball. A rabbet 69 on the upper surface of the wheel engages the lower edge of a sleeve 70 which is attached to casting 15.

A vertically slidable table block 71 is mounted in sleeve 70 and is keyed to the sleeve by means of a key way 72 which engages a key 73 attached to the sleeve by screw 74. A micrometer screw 75, pinned to hand wheel 65 engages a nut 76 attached to the table block, so that the table may be driven in the vertical direction by turning hand wheel 65. A micrometer scale 77, attached to the wheel, cooperates with an index marker 78 mounted on casting 15 to indicate the travel of the table. Pinned in the upper end of the table block is a shaft 79, on which is journalled a bracket 80. The bracket is retained by a plate 81 attached to shaft 79. Friction washers 82 and 83 may be inserted between the plate 81 and the bracket to insure free rotational movement of the bracket. A vernier scale 11, attached to bracket 80, cooperates with a scale 111 around the edge of table block 71 to indicate the angular position of the bracket with respect to the table block. As illustrated in Figs. 2, 4 and 5, a finger 121 is attached to table block 71 and extends downward into a slot 122 in casting 15. This finger carries a scale 123 which cooperates with an index mark 124 on casting 15 to indicate the number of full rotations of hand wheel 65. In measuring the vertical travel of the table block, the fractional amount of the final turn is read on scale 77 and added to the total number of turns indicated on scale 123 to obtain the total travel.

Mounted on edge in bracket 80 is a square guide bar 87, the left hand end of which, as viewed in Fig. 5, is cut down to triangular shape and fits into a V-groove 88 in the braket. A clamp plate 89 locks the triangular end of the bar in the groove. This bar supports a microscope housing 90 having an inverted V-groove 91 on its under side. A pair of bearing blocks 92 and 93 supported by the housing support a shaft 94 to the ends of which are attached hand knobs 95 and 96. A tapered disk 97 is mounted on shaft 94 and engages a tapered longitudinal slot 98 in the bottom of bar 87 to provide a friction drive for moving the microscope housing along the bar. This disk and slot drive arrangement is similar to the friction drive provided for sleeve block 25 by disk 31 and slot 32.

An alternative arrangement for driving microscope housing 90 horizontally is illustrated in Fig. 10. A plate 126 is attached to the bottom of the housing and supports a pair of blocks 127 and 128 which form a V-way for the under edge of bar 91. For accurate alignment of the housing, block 128 is adjustable toward block 127 by means of one or more set screws 129. Shaft 94 is rotatably mounted in the housing and is spring-pressed downward by means of a spring 130 which acts on a bearing block 131 vertically slidable in a slot in the housing. Disk 97 is thus mounted above bar 91 and operated in a tapered slot 125 along the top of the bar. The principle of operation is the same except that the direction of rotation of handwheel 95 is reversed.

The microscope housing contains magnifying optical system of conventional type consisting of an objective lens 99, a compensating lens 100 and an ocular lens 101. The ocular lens is mounted in an ocular housing 102 which is fixed in a sleeve 103, rotatably mounted in housing 90 and having knurled flange 104 which provides a hand grip. A reticle 105 having horizontal and vertical cross hairs intersecting the optical center of the system is also mounted in housing 102. These cross hairs are represented by lines 106 and 107 respectively in Figs. 8 and 9. The recticle may also have a series of arcs 132 of varying radius corresponding to various flute radii. These arcs, if extended would all pass through the optical center tangentially to the vertical hairline.

A vernier scale 108 is attached to flange 104 and cooperates with a fixed scale 109, attached to the housing 90, to indicate the angular position of the ocular housing. The zero setting of this vernier scale is aligned with the true vertical and horizontal positions of the cross hairs.

The operating parts of the instrument are constructed and aligned with the care normally required for a precision measurement device. In particular, the center of rotation of the optical system must be accurately aligned to coincide with the center line of the chuck when vernier 110 reads zero, and to lie parallel to the horizontal traverse of the optical housing along bar 87. At one point in its travel the microscope housing is at such a position that, the axis of rotation of bracket 80 passes vertically through focal point of the optical system.

The vertical traverse of the micrometer drive is aligned with this vertical axis. The center line of the chuck is aligned with the axis of rotation of trunnion 33 in sleeve block 25 and the horizontal travel of block 25 in ways 23 and 24 is aligned parallel to this axis.

Fig. 6 illustrates the outline of the tooth section of a typical tap having curved flute surfaces 112 and 113, as viewed in a plane perpendicular to the tap axis. The flutes are here illustrated as ground on a true radius. The "chord angle," which is frequently used as a measure of tap characteristics, is the angle between the center line 114, drawn to the tip of the tooth, and the chord line 115 joining the tip of the tooth to the point of intersection of the root of the thread with the flute face as viewed in this plane. The "hook angle" is the angle between center line 114 and the line 116 which is the tangent to the flute surface at the tip of the tooth. If the flute is ground on a curve other than a true arc, the chord angle might vary although the hook angle might remain the same. It is apparent that the chord angle will also vary with the pitch, or depth, of the thread even though the shape of the flute, and consequently the hook angle, remains the same. For these reasons, the hook angle, which is directly related to the angle of the flute surface to the material to be cut at the point of entry of the tooth into the material, is the best criterion of cutting characteristics for taps having curved flutes. If the tap is ground with a flat face from tip to root, the chord angle coincides with the angle of rake. This instrument can be used to measure the hook or rake angles, as well as certain other characteristics, of a tap in the following manner:

The tap shank is inserted in the chuck, and the chuck is tightened by turning ring 49. Trunnion 33 may be held stationary while tightening the chuck, either by holding hand wheel 34, or by depressing knob 58. The section of the tap to be examined is then placed approximately at the focal point of the optical system, by turning one of the hand knobs 29 or 30. With the vernier and scale 110 and 111, indicating the angular position of the microscope, and the vernier and scale 108 and 109, indicating the position of the reticle, set at zero, the tap is observed through the microscope and the chuck rotated by means of hand wheel 34 until the tip of a tooth section coincides with the vertical hairline. The microscope is then elevated, by turning handwheel 65, until the tip of the tooth section also coincides with the horizontal hairline. At this point, the reading of the elevation scale 77 of the microscope should be noted as the index for later determination of certain linear dimensions of the tap.

Figure 8:
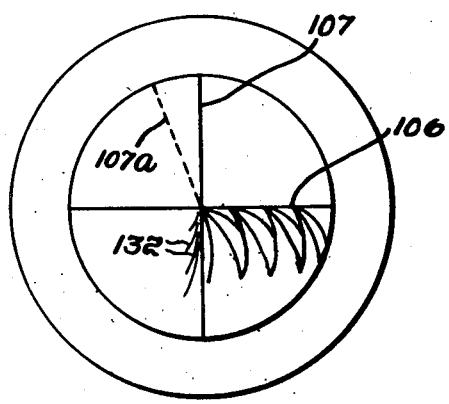
Fig. 8 is a diagram illustrating the teeth of a tap as viewed through the ocular of the device, and the manner of determining certain tooth dimensions.
Figure 9:
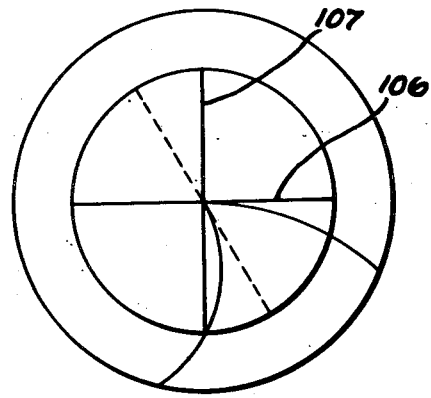
Fig. 9 is a diagram illustrating a section along line 9—9 of the tap shown in Fig. 7, as viewed through the ocular of the device.

It is apparent that, if the tap is viewed directly parallel to its axis, all the teeth of a tooth section will merge into a single image, as shown in Fig. 9, and it is impossible to determine the hook or rake of each tooth individually. To make possible individual observation of the teeth, the microscope housing is rotated about shaft 79 so as to view the tap at an angle to the axis. The angle of view is set by means of scale 111. The image of the teeth at the flute face as viewed in the microscope will then appear, somewhat as in Fig. 8, where the angle of view and curvatures have been somewhat exaggerated for sake of illustration. The normal angle of view is between 3 and 5 degrees. The images in Figs. 8 and 9 have been illustrated for clarity as corresponding to the actual position of the tap teeth. It is understood that a conventional microscope optical system would reverse the images from right to left and from top to bottom. The principles of measurement of the angles, however, would be the same.

With the microscope housing rotated to the viewing angle, the image of the tip of the particular tooth to be examined is brought exactly to the center of the hairlines by adjusting the horizontal position of the chuck. The slip ring 51 is rotated to set the vernier index at zero on scale 54, and the ring locked to the chuck by tightening lock screw 55.

When the instrument is set up as just described, the hook or rake angle of the tooth in focus, with its tip at the intersection of the hair lines, may be readily measured by rotating the ocular housing 103 so as to bring the vertical hair line 107 to a position bisecting the angle of the cutting face of the tooth at the tip, as indicated by the dotted line 107a in Fig. 8, and reading the angle on scale 109. It is apparent that the angle thus measured will not be the true hook angle, but, rather, the projection of the hook angle in a plane tilted from the plane of cross-section by an angle equal to the viewing angle. The error thus introduced may be determined by the formula:

$$\tan y = \frac{\tan x \tan^2 z}{1-\tan^2 z - \tan^2 x}$$

$x$—hook angle
$y$—angle of error
$z$—viewing angle

For the relatively small viewing angle required, however, and the normal range of hook angles, the error is very small. For example, for a hook angle of 10° and a viewing angle of 5°, the error is 4.5 minutes or .75%. Since an accuracy within the order of 1° is ordinarily sufficient in measuring hook or rake, this error may be considered negligible.

Instead of using the vertical hairline to determine hook angle, one of the arcs 132 may be brought to a position bisecting the angle of the tooth face. The arc conforming to the flute radius is selected by visual comparison with the edge of the tooth, the hook angle is read in the same manner from scale 109 and should correspond to that obtained by using the vertical hair line.

The index angle between flutes is measured by rotating hand wheel 34 to bring the tip of a tooth beyond the next flute up to the intersection of the hairlines and reading scale 54.

Concentricity of the outside diameter to the shank is determined by rotating the chuck head and noting departure of the crest of the tooth from the horizontal hairline. The linear dimension at the furthest point of departure can be measured by turning the micrometer handwheel 65 to bring the horizontal hairline in line with the crest of the tooth at this point, reading scale 77, and subtracting the initial scale reading.

To measure the spiral point angle of the tap, the ocular scale index 108 is set at zero, and the microscope housing is swung about shaft 79 until the tips of all the teeth along the spiral point appear in the microscope to coincide with the vertical hairline as each tooth is brought into focus by adjusting the horizontal travel of the microscope with handwheel 95 or 96. The microscope will then be aligned with the cutting faces of the teeth along the spiral point, for example, along line 117 of Fig. 7, and the spiral point angle may be read on scale 111.

Figure 7:
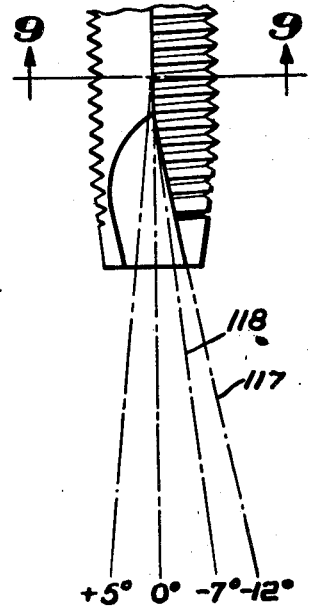
Fig. 7 is a diagram illustrating the manner of viewing and measuring certain other tap dimensions by means of the device.

The hook or rake of the teeth along the spiral point is measured by rotating the microscope housing to view the spiral point at a small angle for example, along line 118 in Fig. 7 turning handwheel 65 to bring the image of the tip of each tooth in turn to the intersection of the hairlines, rotating the ocular so that the vertical hairline bisects the angle of the tooth face at the tip, and reading scale 109.

When the microscope housing is rotated in either direction to view the tap at along a line perpendicular to the tap axis, a number of other critical dimensions may be readily measured, for example, the concentricity of the root diameter can be determined by turning handwheel 65 to bring the root of one of the teeth to the horizontal hairline, rotating the chuck, and measuring any departure of the root diameter from the original setting on scale 77. The outside diameter can be determined by multiplying by 2 the original reading of scale 77. The root diameter is measured in a similar manner by setting the intersection of the hairlines at the root of a tooth and multiplying the reading on scale 77 by 2.

The chamfer angle is determined by adjusting handwheel 65 and rotating the ocular housing until the horizontal hairline coincides with the tips of the teeth along the chamfer, in which position the angle is indicated on scale 109.

To obtain the flank angles of a thread, the helix angle is first determined, with the microscope housing set in the 90° position, by rotating the vertical hairline to coincide with a thread. The microscope housing is then rotated about shaft 70 to view the tap along the helix angle, and the flank angles read from scale 109 by rotating the ocular in either direction until the vertical hairline coincides with the flank of the tooth. Irregularities in thread profile and helix angle can also be observed with the microscope in this position. Throughout the various measuring operations, the horizontal positions of the chuck and microscope housing are adjusted as necessary to bring the section to be inspected into proper focus.

By means of the instrument here described, all of the foregoing measurements, as well as measurements of other important dimensions of the tap or other tool, can be made rapidly and accurately without changing the set-up of the tool, or damaging the tool in any way. In addition, the instrument provides a convenient means of microscopic inspection of the tooth and flute surface finish. The instrument thus makes possible a more complete and accurate determination of the important characteristics of a tool, than could previously be obtained by a number of time-consuming operations requiring several measuring instruments. While this instrument is especially useful for inspection of threading and cutting tools, it can readily be used in a similar manner for examining screws and bolts.

What is claimed is:

1. A device for the inspection of cutting tools and the like comprising: a supporting base; a tool holder, adapted to align a tool along a horizontal axis, mounted on said base; a vertically slidable sleeve mounted on said base; a lead screw threadably engaging said sleeve and adapted to impart vertical motion thereto; a supporting member carried by said sleeve and rotatable about a vertical axis intersecting said horizontal axis; a microscope mounted on said member, with its optical axis horizontal and intersecting said vertical axis, and disposed to view a tool placed in said holder; a reticle, having an index line disposed on a path traversing said optical axis, mounted in said microscope; means for rotating said reticle about said optical axis; a means indicating the angular position of said reticle.

2. A device according to claim 1 having a handwheel attached to said screw for rotating the same, a scale on said hand wheel, and a fixed index cooperating with said scale to indicate the vertical travel of said sleeve.

3. A device according to claim 1 having means for axially moving said microscope comprising: a V-way attached to the underside of said microscope; a V-shaped bar projecting from said supporting member and slidably engaging said V-way; a tapered groove in said bar parallel to said way; a shaft supported from said microscope traversely of said way; a tapered disk mounted on said shaft in frictional engagement with the sides of said groove; and a hand knob attached to said shaft for rotating said disk, thereby driving said microscope along said bar.

4. A device according to claim 1, having a fixed scale on said microscope, and said reticle being carried by a sleeve rotatably mounted in said microscope and having scale markings cooperating with said fixed scale.

5. An inspection device for taps and the like comprising: a supporting base; a pair of horizontal ways on said base; a block slidably mounted in said ways; a tool holder mounted on said block, adapted to align a tool along an axis parallel to said ways, and rotatable about said axis; a tapered groove in said block parallel to said ways; a shaft journalled on said base transversely to said ways; a tapered disk mounted on said shaft and frictionally engaging said groove; a handle attached to said shaft for rotating said disk, thereby driving said block along said ways; a microscope mounted on said base with its optical axis horizontal, said microscope being rotatable about a vertical axis intersecting said tool axis; a reticle mounted in said microscope having a center mark coinciding with said optical axis; an index line on said reticle having a predetermined relationship to said center mark; means for rotating said reticle about said optical axis and means indicating the angular position of said reticle.

6. An inspection device for taps and the like comprising: a supporting base; a block, mounted on said base; a chuck body mounted on said block and rotatable about a horizontal axis; a tool holder mounted on said body and adapted to align a tool along said axis; a recess in said body; a pin slidably mounted in said block and disposed to engage said recess, thereby locking said body against rotation; a spring normally holding said pin out of engagement with said recess; a microscope mounted on said base with its optical axis horizontal, said microscope being rotatable about a vertical axis intersecting said tool axis; a reticle mounted in said microscope having a center mark coinciding with said optical axis; an index line on said reticle having a predetermined relationship to said center mark; means for rotating said reticle about said optical axis; and means indicating the angular position of said reticle.

7. An inspection device for taps and the like comprising: a supporting base; a sleeve mounted on said base; a chuck body mounted in said sleeve and rotatable about a horizontal axis; a tool holder attached to said body and adapted to align a tool along said axis; a scale fixed to said sleeve; a ring mounted on said body and rotatable about said axis; an index mark on said ring adapted to cooperate with said scale; means for locking said ring against rotation with respect to said body; a microscope mounted on said base with its optical axis horizontal, said microscope being rotatable about a vertical axis intersecting said tool axis; a reticle mounted in said microscope having a center mark coinciding with said optical axis; an index line on said reticle having a predetermined relationship to said center mark; means for rotating said reticle about said optical axis; and means indicating the angular position of said reticle.

8. The method of measuring hook or rake of the teeth of a tap or the like which comprises the following steps: disposing a microscope having a reticle bearing an index line disposed in a path traversing its optical axis, with its optical axis at a slight angle to the axis of the tool, but in a plane parallel to the tool axis; bringing an image of a selected tooth of the tap into focus with its tip lying on said optical axis; first aligning said index line in a path traversing the axis of the tap; and then aligning said index line with a selected part of the image of the tooth.

9. The method of measuring hook or rake of the teeth of a tap or the like which comprises the following steps: disposing a miscroscope having a reticle bearing an index line disposed in a path traversing its optical axis, with its optical axis at a slight angle to the axis of the tool, but in a plane parallel to the tool axis; bringing an image of a selected tooth of the tap into focus with its tip lying on said optical axis; first aligning said index line in a path traversing the axis of the tap; and then aligning said index line tangent to the face of the tooth at its tip.

10. The method of measuring hook or rake of the teeth of a tap which comprises the following steps: disposing a miscroscope, having a reticle bearing an index line disposed in a path traversing its optical axis, with its optical axis at a small angle to the flute face of the tap in the region of the teeth, and in a plane parallel to the tool axis; bringing an image of a selected tooth of the tap into focus with its tip lying on said optical axis; first aligning said index line in a path traversing the axis of the tap; and then aligning said index line to bisect the angle of the image of the flute face at the tip of the tooth.

References Cited in the file of this patent

UNITED STATES PATENTS

| | | |
|---|---|---|
| 1,354,587 | Taylor et al. | Oct. 5, 1920 |
| 1,377,069 | Hartness | May 3, 1921 |
| 1,489,372 | Steinle | Apr. 8, 1924 |
| 1,761,260 | Gallasch | June 3, 1930 |
| 2,025,215 | Munn | Dec. 24, 1935 |
| 2,052,591 | Williams | Sept. 1, 1936 |